Figure 1:
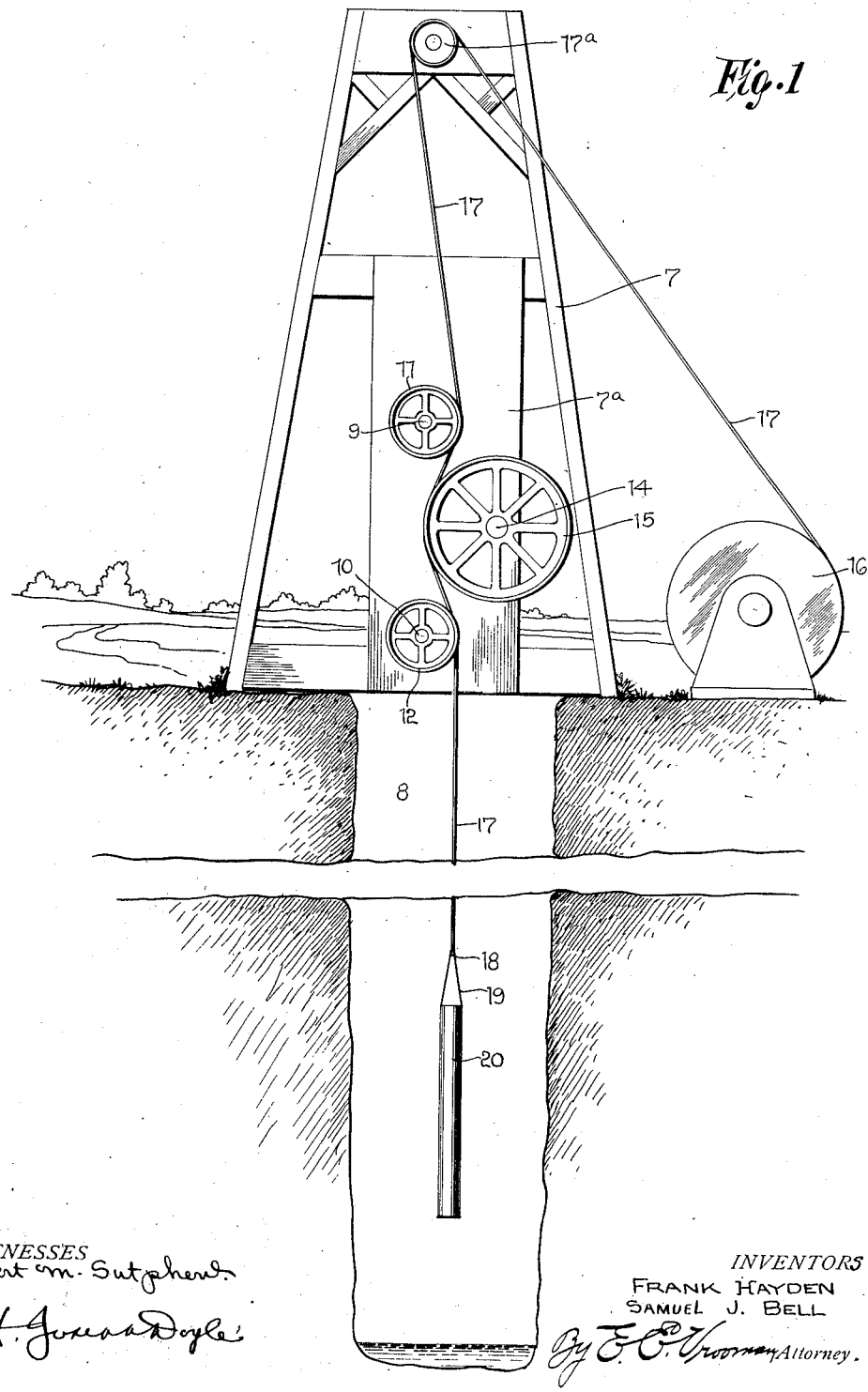

F. HAYDEN & S. J. BELL.
MEASURING MACHINE.
APPLICATION FILED MAY 10, 1911.

1,044,384.

Patented Nov. 12, 1912.

3 SHEETS—SHEET 1.

WITNESSES

INVENTORS
FRANK HAYDEN
SAMUEL J. BELL
Attorney.

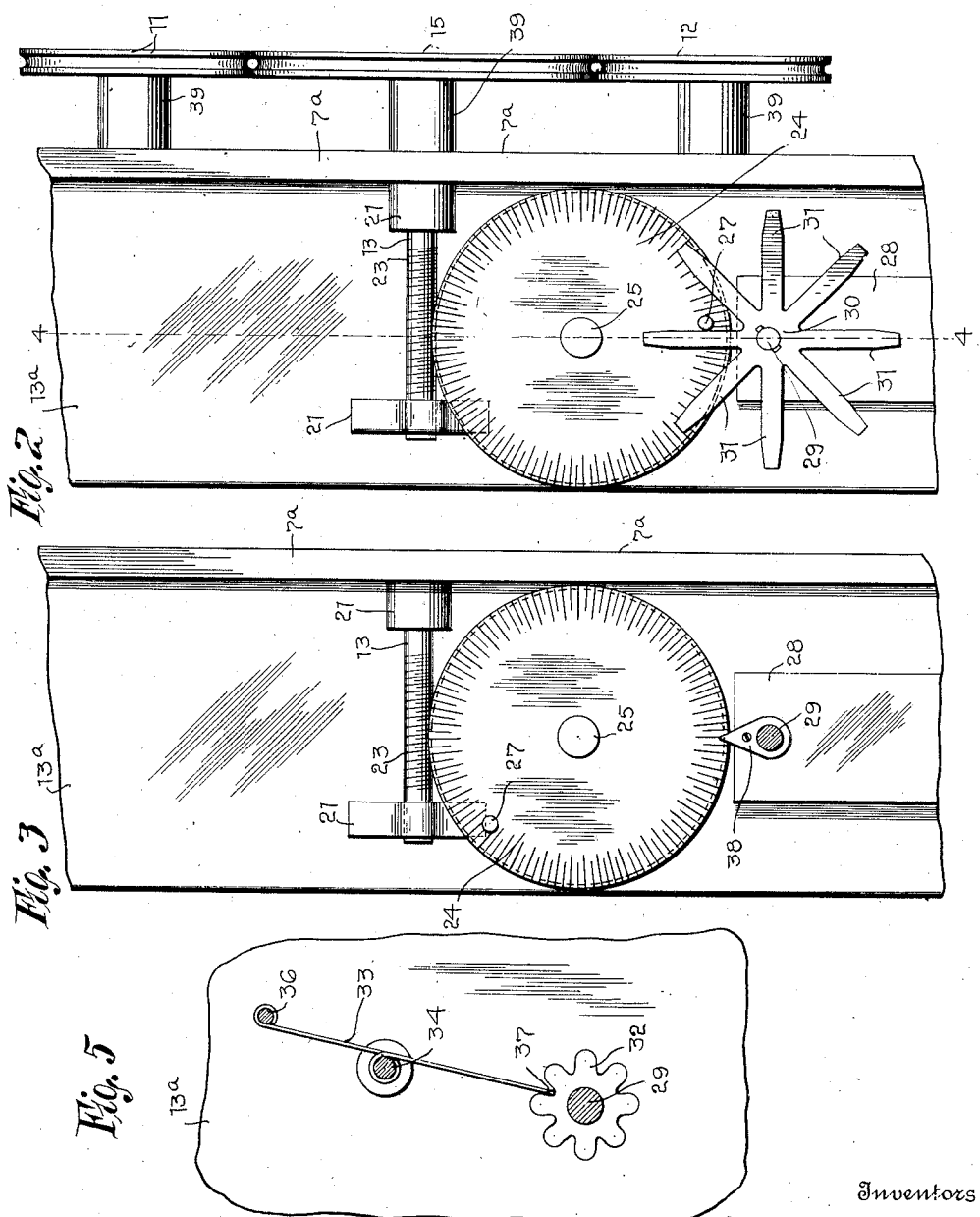

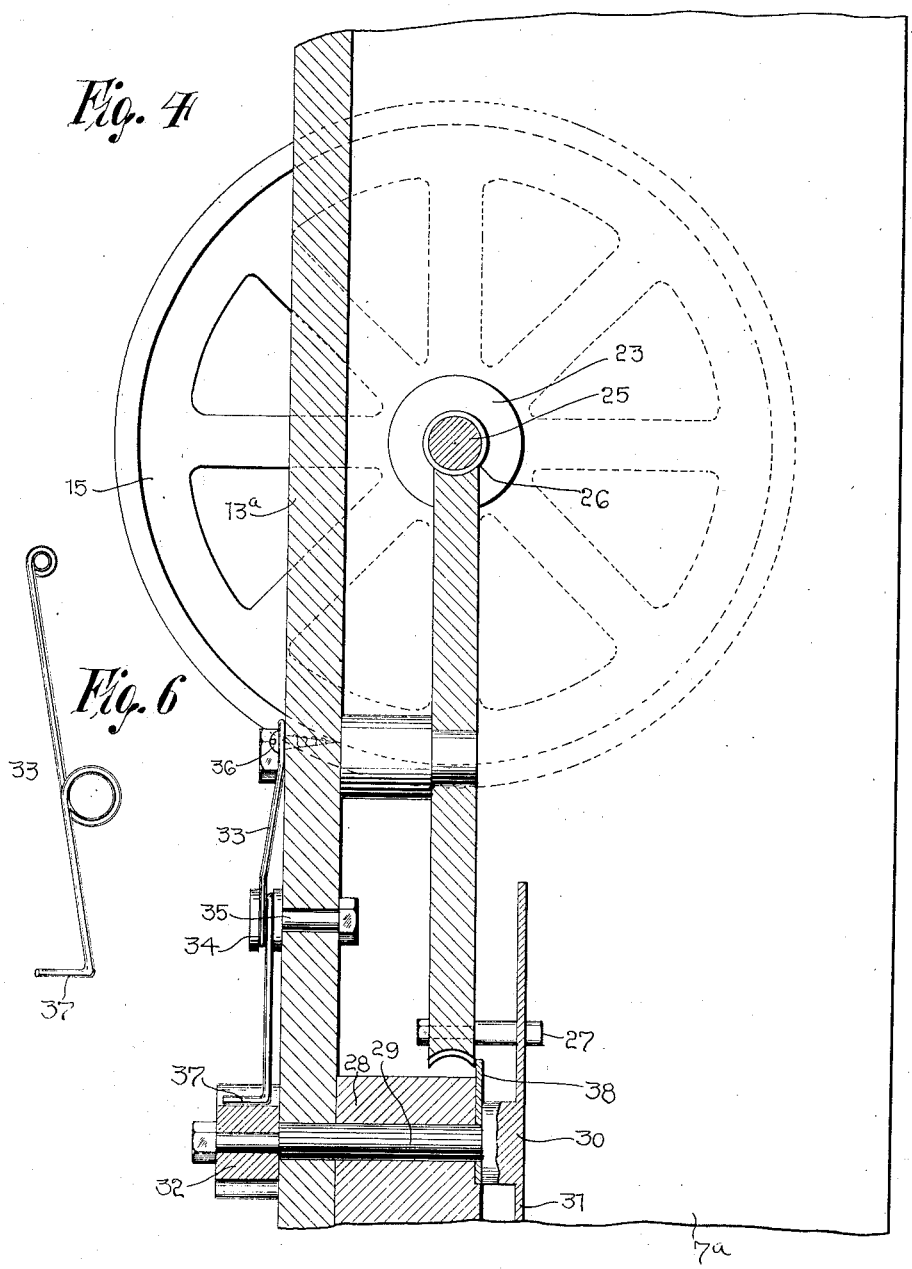

UNITED STATES PATENT OFFICE.

FRANK HAYDEN AND SAMUEL J. BELL, OF OTSEGO, OHIO.

MEASURING-MACHINE.

1,044,384.  Specification of Letters Patent. Patented Nov. 12, 1912.

Application filed May 10, 1911. Serial No. 626,237.

*To all whom it may concern:*

Be it known that we, FRANK HAYDEN and SAMUEL J. BELL, citizens of the United States, residing at Otsego, in the county of Muskingum and State of Ohio, have invented certain new and useful Improvements in Measuring-Machines, of which the following is a specification, reference being had therein to the accompanying drawing.

This invention relates to the subject of ascertaining depths of wells and the like, and the principal object of the same is to provide a simple apparatus in which means are actuated by a weighted cable lowered into a well to accurately and quickly measure and indicate the measurements of the cable paid out so that such measurement can be ascertained by a glance at the apparatus.

A preferred and practical embodiment of the invention is shown in the accompanying drawings, wherein:—

Figure 1 is a view in front elevation of the measuring apparatus as it appears when in use. Fig. 2 is a fragmentary view in rear elevation of the measuring apparatus. Fig. 3 is a similar view, the tally wheel and the cable pulleys being omitted. Fig. 4 is a vertical longitudinal sectional view taken on the line 4—4, Fig. 2. Fig. 5 is a detail view of the rear surface of the supporting board showing a pawl and ratchet for the shaft of the tally wheel. Fig. 6 is a detail perspective view of the pawl shown in Fig. 5.

The improved measuring apparatus comprises a frame 7, arranged in the form of a vertical derrick adapted to be placed across the upper end of a well 8 and which carries a vertically arranged supporting board 7ª through which stub shafts 9 and 10 project laterally, and on which idler pulleys 11 and 12 are mounted. Pulleys 11 and 12 are in spaced vertical alinement. Said pulleys are preferably grooved peripherally and may be solid, as shown or of any other suitable or preferred type. A drive shaft 13 has a projecting end 14 that is centrally disposed and to one side relatively to pulleys 11 and 12 and on which a guiding pulley 15 is mounted. A windlass 16 is disposed adjacent one end of derrick 7 and a cable 17 extends therefrom and passes around a pulley 17ª in the upper portion of said derrick. Cable 17 depends from pulley 17ª and engages one portion of pulley 11, the portion of pulley 15 that projects between pulleys 11 and 12, and one portion of pulley 12. This arrangement of pulleys 11 and 12 places a tension on cable 17 and holds the same in contact with pulley 15. The free end of cable 17 carries a hook 18 for engaging a loop 19 carried by a weight 20. Shaft 13 extends transversely across and is journaled in a bearing 21 carried by the board 13ª that projects at right angles from one longitudinal edge of board 7ª, said shaft being provided with threads 23. A dial wheel 24 is rotatably mounted on a shaft 25 projecting from board 13ª, said wheel having its periphery provided with teeth 26 that are in mesh with the threads of shaft 13. The outer surface of dial 24 is provided with graduations designating feet and fractions thereof, and said outer surface is also provided with an upstanding lug 27.

Board or support 13ª carries a bearing block 28 in which a shaft 29 is journaled. The outer end of shaft 29 has a tally wheel 30 fast thereon, the radiating arms 31 of which overlap the dial 24 and are in the path of movement of the lug 27. Shaft 29 projects beyond the rear of board 13ª and carries a ratchet disk 32. A spring pawl 33 is coiled about the grooved head 34 of a lug or bolt 35 carried by board 13ª and has one end fastened to a screw 36 also carried by said board. The free end of pawl 33 has an angular tooth 37 that engages the teeth of ratchet 32 and opposes rotary movement of said ratchet. An indicator or pointer 38 is fast on block 28 and overlaps dial 24.

The threaded engagement of shaft 13 with dial 24 is such that one complete rotation of said dial designates 500 feet and the arms 31 of tally wheel 30 are marked to indicate measurements in 500 feet. For example one arm is marked 000, the next arm 500, the next one 1,000, and so on, and as the said arms are in the path of movement of lug 27, it will be seen that the first rotation of dial 24 causes lug 27 to move the zero arm and bring the 500 feet arm in position to be engaged by the said lug 27 on the next rotation of dial 24. By this arrangement, it will be clear that the tally wheel at all times indicates the length of the cable that travels over pulley 15, the pawl 33 and ratchet 32 obviously prevent accidental movement of said tally wheel, and it will also be clear that the pointer 38 coöperates in the measuring operation by indicating the measurements at any point between two of the arms 31.

In the foregoing description it has been stated that the tally arms 31 are marked to indicate measurements of 500 feet and over, this marking being adapted for deep wells, such as oil wells, but it will be understood that different markings can be used if desired so that the depth of shallow wells can be readily ascertained.

In addition to the foregoing prominent feature incidental details such as spacing sleeves, or ferrules 39 are employed for the shafts 9, 10 and 14 to space the pulleys 11, 12 and 15 from board 7ª, and a similar sleeve or ferrule 40 is carried by shaft 25 to space the dial 24 from board 13ª. The frame, including the boards 7ª and 13ª, is preferably of metal, although it will be clear that wood or other material may be used if desired.

What we claim as our invention is:—

A measuring apparatus comprising a main frame adapted to straddle the mouth of a well, a vertical supporting board on said frame, lateral stub shafts on said board, spaced idle pulleys on said shafts, a threaded drive shaft, a drive pulley thereon partly between and in the same vertical plane with the said idle pulleys, a windlass operated cable passing over an elevated pulley and downward between said idle pulleys and said driving pulley, a fathoming weight on the lower end of said cable, a dial carried by said frame and rotated by said threaded shaft, a lug on said dial, a tally wheel comprising a plurality of radial fingers and being adapted to be engaged by said lug upon said dial for counting the length of cable adapted to pass over said pulley, an indicator carried by said support and coöperating with said tally wheel, and means for retarding the rotary movement of said wheel.

In testimony whereof we hereunto affix our signatures in presence of two witnesses.

FRANK HAYDEN.
SAMUEL J. BELL.

Witnesses:
NORMA L. RIDGWAY,
LILLIAN M. RIDGWAY.